Patented Feb. 14, 1933

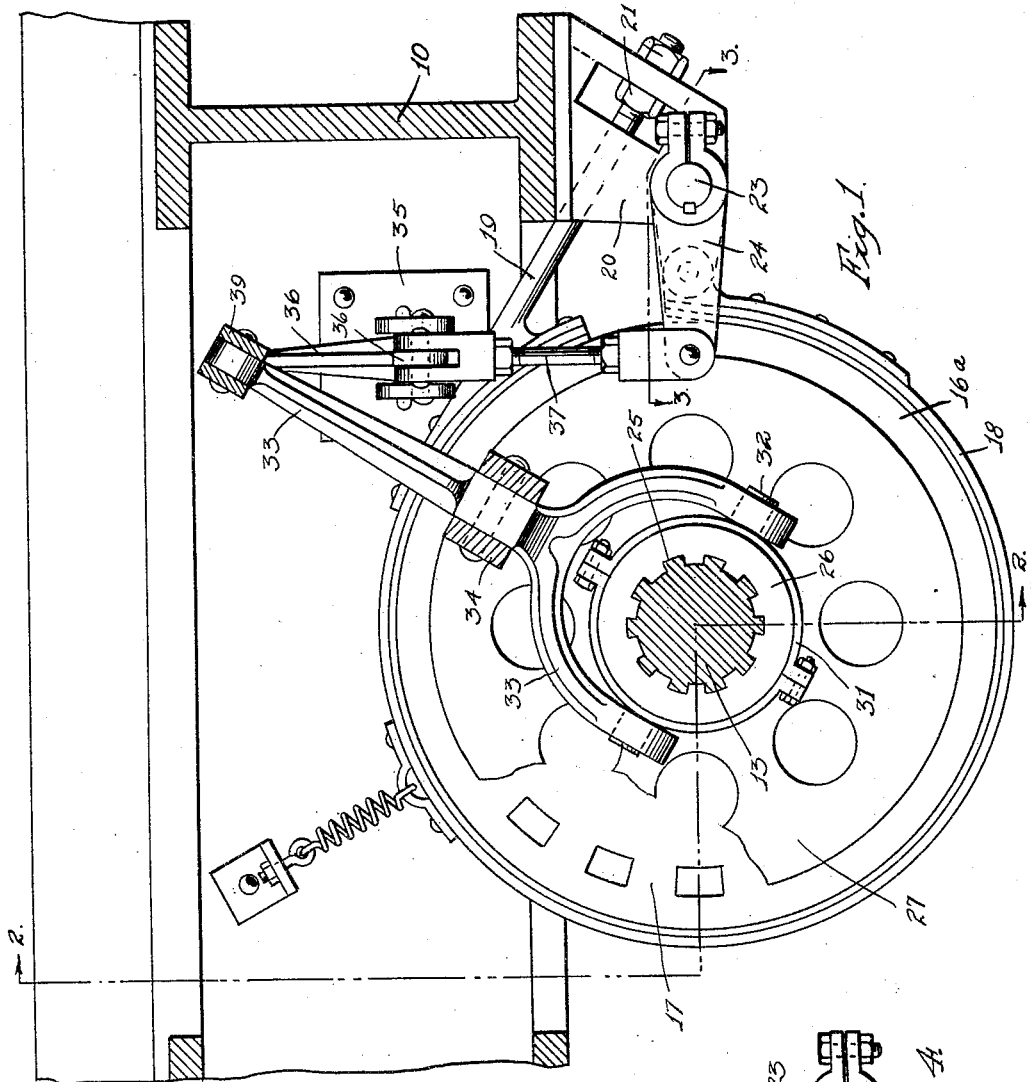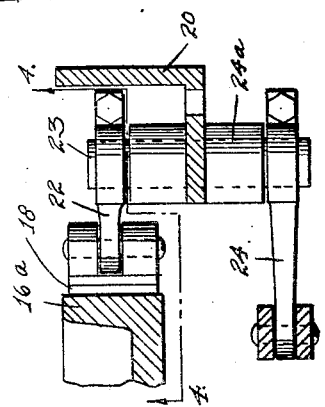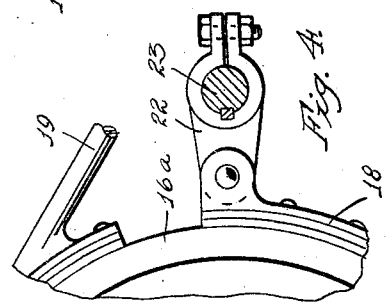

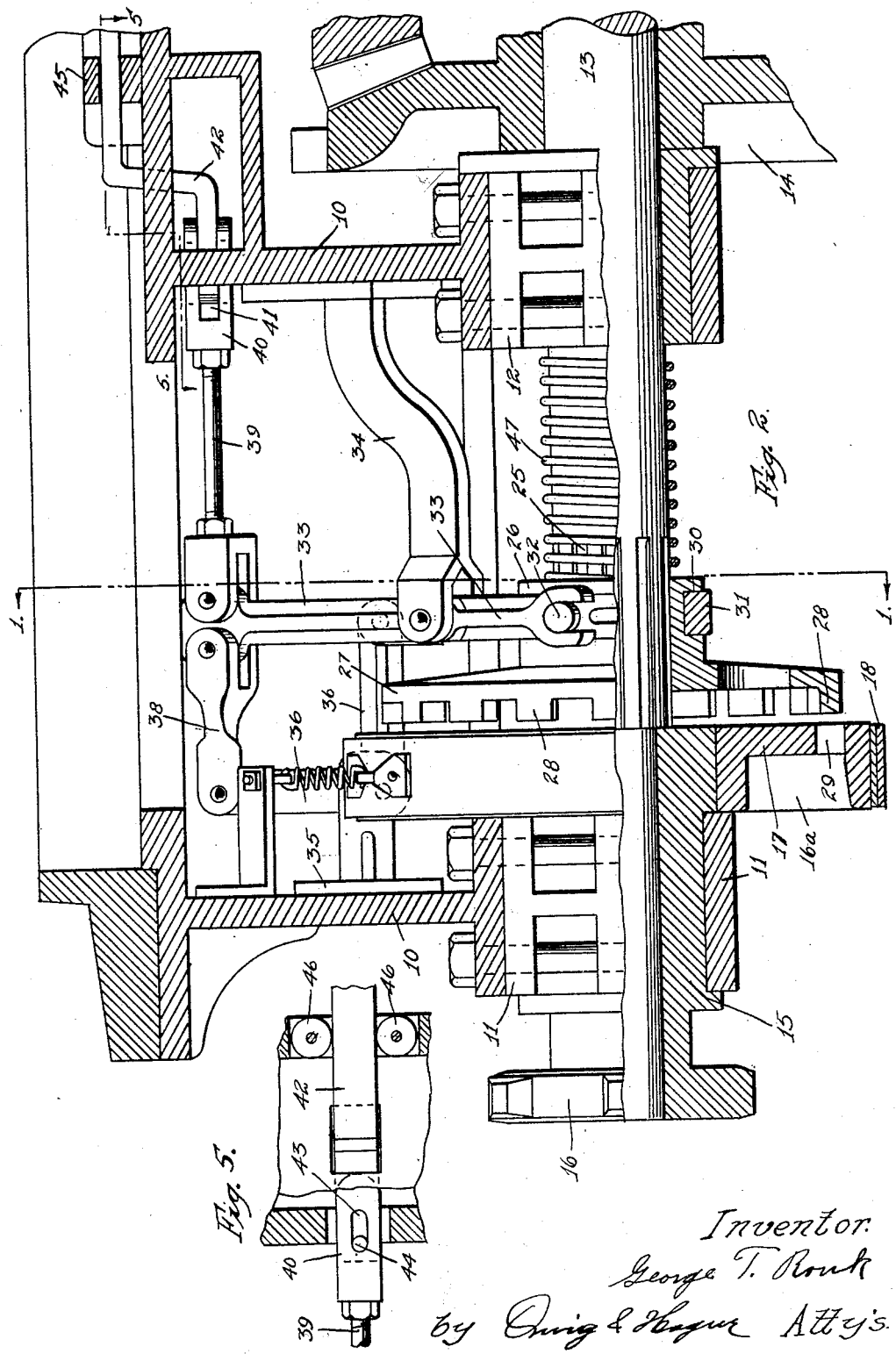

1,897,180

UNITED STATES PATENT OFFICE

GEORGE T. RONK, OF CEDAR RAPIDS, IOWA

STEERING MECHANISM FOR TRACTORS

Application filed February 28, 1928. Serial No. 257,772.

This invention relates to improvements in steering mechanism as applied to that type of tractors employing what is commonly known as the link treads, and in that type of steering mechanism in which one of the tread members is thrown out of operative relation with the driving mechanism and locked against movement while the other tread member is thrown into operative relation with the driving mechanism. My present invention pertains to that part of the mechanism for locking the tread and for throwing it into and out of operation with the driving mechanism, and is particularly designed to be used in connection with the mechanism illustrated in my co-pending application for United States Letters Patent filed January 27, 1926, Serial Number 84,257, and is an improvement over the mechanism for throwing the driving pinion into and out of operation with the driving mechanism, or locking the said pinion.

The object of my invention is to provide improvements in the means for locking the driving pinion against movement, which consists in providing a brake drum instead of a cone clutch, having a band brake for locking the drum against movement, said drum including one member of the jaw clutch for locking the pinion and the driving shaft together, and to provide improved mechanism for simultaneously operating said jaw clutch and said brake band, whereby the brake band will be set at the time the jaw clutches are disengaged, or vice versa; and to provide in connection therewith a yieldable member whereby the said brake band and jaw clutches may be automatically thrown to their normal working positions.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is a transverse sectional view taken on the line 1—1 of Figure 2.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 3.

Figure 5 is a detail sectional view taken on the line 5—5 of Figure 2.

I have used the reference numeral 10 to indicate the frame of a ditcher truck which is provided with bearing members 11 and 12. The said bearing members are designed to rotatively support a driving shaft 13 driven by means of a gear 14 forming a part of the differential gear mechanism. The outer end of the shaft 13 is provided with a sleeve 15 rotatively mounted thereon and within the bearing 11. The outer end of the sleeve 15 has a sprocket wheel 16 for the purpose of driving one of the tread members of the truck. The inner end of the sleeve 15 is provided with a brake drum 16a having a web portion 17, said drum being fixed to the sleeve. The drum 16a is provided with a brake band 18 of the usual construction, having one end fixedly by means of a bolt 19 secured in a bracket 20 supported from the frame 10. The said bolt 19 has nuts 21 whereby the fixed end of the band 18 may be adjusted relative to the drum 16.

The opposite end of the band 18 is pivotally connected to an arm 22 mounted on a rock shaft 23 supported in a bearing 24a carried by the bracket 20, as clearly illustrated in Figures 1 and 3. The shaft 23 is also provided with a rock arm 24 supported inside of the inner edge of the drum 16 a slight distance. The shaft 13 is provided with a fluted portion 25 on which is feathered a hub 26 supporting a disk 27 having laterally projecting teeth 28 designed to enter openings 29 in the web 17 of the drum 16. The disk 27, the teeth 28 and the web portions between the openings 29 form what I shall term a jaw clutch. The disk 27 and the teeth 28 form one member of the clutch, while the web 17 forms the other member of the jaw clutch. The hub 26 is provided with a circumferential groove 30 for receiving a band 31 having pivot pins 32. A forked lever 33 is pivotally connected in a bracket 34 supported from the frame 10, having one end operatively connected with the pins 32 and its opposite end inclined upwardly and laterally, as shown in Figure 1. The upper end of the lever 33 is supported in a plane extended vertically through the inner end of the arm 24.

Supported on the frame 10 is a bracket 35 designed to support a bell crank lever 36 having horizontal and vertical arms, the horizontal arm extending inwardly and terminating at a point vertically above the inner end of the arm 24. An adjustable link 37 is provided for connecting the horizontal portion of the lever 36 with the inner end of the arm 24, while a link 38 is provided for connecting the inner end of the arm 33 with the vertical member of the bell crank lever 36.

The upper end of the arm 33 is also provided with an adjustable link 39 having its inner end provided with a head 40 having a notch or groove 41 for slidably receiving one end of an operating bar 42. The parallel members of the head 40 are provided with slots 43 for receiving a pin 44 of the bar 42. The bar 42 is slidably mounted in a guide member 45 mounted on the frame 10, said guide member including rollers 46.

The shaft 13 is provided with extensible spring 47 having one end resting against the hub 26 and its opposite end against the bearing member 12, so that the jaw member 27 is normally retained in operative relation with the web 17. This would cause the inner end of the lever 33 to be moved outwardly and its upper end moved inwardly, and the inner end of the horizontal arm of the bell crank 36 to be lowered, which in turn would lower the inner ends of the arms 24 and 22 and loosen the band 18 on the drum 16a, thereby permitting the sleeve 15 and said drum to rotate freely within the brake band. The shaft 13 and said sleeve are locked together by means of the jaw clutch members, thereby providing means whereby power may be transmitted from the gear 14 to the sprocket 16.

If the bar 42, as viewed in Figure 2, is moved to the left by means of steering mechanism as illustrated in my said co-pending application, or any other suitable operating mechanism, the links 39 will be moved to the left, causing the upper end of the lever 33 to be moved outwardly and also the upper end of the bell crank 36, causing the jaw clutch members to be disengaged and the band 18 to be set on the drum 16a, thereby releasing the shaft 13 from the sleeve 15 and setting said sleeve against rotation. It is understood that two sets of the mechanism above described are provided in one machine, the clutch members of the opposite mechanism being in operative relation with the differential gears and the steam mechanism, which will provide means whereby the truck may be steered in the usual manner.

It will be noted from the above description that the spring 47 performs the double function of moving the jaw clutch members into operative relation and simultaneously releasing the brake band from the brake drum by very simple and effective mechanism. The pins 44 and the slots 43 provide means whereby the two sets of mechanisms may be independently operated by shifting the operating lever either to the right or to the left.

Thus it will be seen that I have provided a very simple and effective mechanism to be used in connection with the steering mechanism of the link type treads, which is positive in its operation and which is not likely to get out of order, and in which means is provided for proper adjustment of the operative parts in the adjustable links 37 and 39.

I claim as my invention:

In a device of the class described, a supporting frame, a driving shaft rotatively mounted therein, a gear fixed to one end of said shaft, a sleeve rotatively mounted on the opposite end of said shaft, said sleeve being provided with a sprocket wheel for operating a link tread, said sleeve being provided with a brake drum, the web of said drum being provided with a circular row of openings concentric with said shaft, a band for said drum, a hub splined to said shaft having a disk, said disk being provided with laterally projecting lugs to coact with the openings of the drum, a spring supported on said shaft for yieldably retaining said lugs within said openings, a lever for releasing the lugs of said disk from said drum, a rock shaft having an arm connected with said brake band, a second arm on said rock shaft, a bell crank lever, and an adjustable link for connecting one end of said bell crank lever with the second rock arm, a link for connecting the other end of said bell crank lever with the lever for releasing said disk, and an adjustable link for operating the last said link.

GEORGE T. RONK.